United States Patent [19]
Tauster et al.

[11] 3,871,994
[45] Mar. 18, 1975

[54] AROMATIZATION PROCESS

[76] Inventors: Samuel J. Tauster, 10 Galahad Dr., Englishtown; John H. Sinfelt, 296 Chaucer Dr., Berkley Heights, both of N.J.

[22] Filed: May 15, 1973

[21] Appl. No.: 360,441

Related U.S. Application Data

[60] Division of Ser. No. 79,665, Oct. 9, 1970, Pat. No. 3,769,238, which is a continuation-in-part of Ser. No. 724,589, April 26, 1968, abandoned.

[52] U.S. Cl.................. 208/137, 208/64, 260/673.5
[51] Int. Cl........................ C10g 35/06, C10g 35/04
[58] Field of Search ........ 260/673.5, 683.3; 208/64, 208/65, 137

[56] References Cited
UNITED STATES PATENTS

| | | | |
|---|---|---|---|
| 2,392,738 | 1/1946 | Holder et al. | 208/134 |
| 2,490,287 | 12/1949 | Welty | 208/64 |
| 2,689,265 | 9/1954 | Dinwiddie et al. | 260/673.5 |
| 2,692,846 | 10/1954 | Oblad et al. | 260/673.5 |
| 2,710,826 | 6/1955 | Weikart | 208/64 |
| 2,873,248 | 2/1959 | Tate et al. | 208/136 |
| 2,943,067 | 6/1960 | Sieg | 260/683.3 |
| 2,967,822 | 1/1961 | Moy et al. | 208/136 |

FOREIGN PATENTS OR APPLICATIONS

| | | | |
|---|---|---|---|
| 747,969 | 12/1966 | Canada | 260/673.5 |

*Primary Examiner*—Delbert E. Gantz
*Assistant Examiner*—James W. Hellwege
*Attorney, Agent, or Firm*—L. A. Proctor

[57] ABSTRACT

Paraffinic hydrocarbons having at least 6 carbon atoms are aromatized at low pressures, preferably atmospheric pressure, in the presence of a novel catalyst comprising a bivalent metal, tetravalent molybdenum and oxygen in chemically combined form supported on deacidified alumina. The supported form comprises a compound having the formula $M_2Mo_3O_8$ where M is a bivalent metal having an ionic radius not greater than 0.95 A.

11 Claims, No Drawings

AROMATIZATION PROCESS

This is a division of U.S. application Ser. No. 79,665, filed Oct. 9, 1970, now U.S. Pat. No. 3,769,238, which is a continuation-in-part of U.S. application Ser. No. 724,589, filed Apr. 26, 1968, each entitled Aromatization Catalyst and Process, now abandoned.

This invention relates to hydrocarbon conversion processes and to improved catalysts therefor. More particularly, this invention relates to processes for aromatization of paraffins and to novel catalysts comprising a compound of a divalent metal, molybdenum and oxygen, designated as ternary molybdenum (IV) oxide, supported on deacidified alumina.

Catalytic reforming is widely used commercially in order to improve the octane rating of feedstocks boiling within the motor fuel range. Basically, the operation involves the contacting of a naphtha, either virgin, cracked, Fischer-Tropsch or mixtures thereof, with a solid catalytic material at elevated temperatures and pressures in the presence of recycled hydrogen, usually using a plurality of reactors in series. Platinum, which is regenerable, is the most widely used catalyst, and the process is generally conducted in a fixed catalyst bed. Both semi-regenerative and cyclic processes are used.

Several reactions take place in the platinum reforming process. These include: (1) dehydrogenation of naphthenes to the corresponding aromatic hydrocarbons, e.g., dehydrogenation of cyclohexane to benzene; (2) isomerization and dehydrogenation of alkylcyclopentanes such as methylcyclopentane to form benzene; (3) aromatization of straight chain paraffins to form aromatic compounds, e.g., conversion of n-hexane and h-heptane to benzene and toluene, respectively; (4) isomerization of straight chain paraffins to form branched chain paraffins; and (5) hydrocracking of the higher boiling constituents of the feed to form lower boiling constituents.

Platinum reforming gives excellent conversion of naphthenes to aromatics with high selectivity, with an attendant substantial increase in the octane number of the effluent over the octane number of the feed. However, paraffins are converted to a much lesser extent, and the selectivity of paraffin conversion to aromatics is low. Instead, a substantial portion of the paraffin content of the feed is converted into $C_1$–$C_5$ hydrocarbons. The research octane number (RON) of the effluent is dependent on the severity of reforming. Under relatively mild conditions, a relatively small percentage of the paraffin content is converted, but the octane number of the effluent is relatively low, for example, about 85 to 90. Higher octane number effluents can be obtained using more severe reforming conditions. Under these conditions a substantial portion of the paraffinic content is converted, but much of this conversion is to light hydrocarbons, i.e., $C_1$–$C_5$, rather than to the more desirable aromatics which raise the octane number of the product.

Further drawbacks of platinum catalysts are their scarcity and high cost. Because of these drawbacks, together with the increasing demands for high octane motor fuels, it is imperative to find alternative catalysts.

Among the characteristics which an aromatization catalyst should possess are: high conversion, high selectivity for the production of aromatic hydrocarbons with a minimum of side reactions, high activity over a long period of time, and ease of regeneration with substantially complete restoration of catalytic activity. Although various catalysts other than platinum and the platinum metals and their compounds have been reported in the literature, none have possessed all of these characteristics to a sufficient degree to achieve any substantial commercial usage in the production of aromatics. One of the best of the non-precious metal catalysts known heretofore is a chromia-alumina type catalyst described in Canadian Pat. No. 747,969, issued Dec. 6, 1966. The catalyst described in this patent comprises chromium oxide on a support of alumina which has been deacidified by doping with a small quantity of a cesium compound sufficient to introduce about 1 to 5 gram atoms of cesium per 100 gram moles of $Al_2O_3$. This catalyst has high initial activity for the aromatization of hydrocarbons such as n-hexane and n-heptane. However, conversion drops rapidly in a comparatively short time on stream, with some loss of selectivity accompanying the drop in conversion. Furthermore, catalytic activity is not fully restored on regeneration.

It is an object of this invention to provide a new aromatization catalyst which is characterized, in a process for aromatization of hydrocarbons, by high conversion, high selectivity, good catalyst life, and good regenerability.

A further object of this invention is to provide an improved process for the aromatization of hydrocarbons using the novel catalyst of this invention.

The new catalysts of this invention comprise a catalytically-active material, designated as a ternary molybdenum (IV) oxide, comprising a divalent metal, tetravalent molybdenum, and oxygen in chemically combined form, and a support comprising deacidified alumina. The catalytically active material is a compound having the formula $$M_2Mo_3O_8$$

where M is a divalent metal having an ionic radius not exceeding 0.95 A (Periodic Table of the Elements; E. H. Sargent & Co.; copyright 1962). These catalysts are formed by impregnating the support successively with water-soluble salts of hexavalent molybdenum and of the deisred divalent metal, calcining, and reducing the molybdenum from the nexavalent to the tetravalent state. This catalyst is useful in carrying out various chemical reactions and particularly for aromatizing paraffins, especially straight chain paraffins.

Paraffinic hydrocarbons containing at least 6 carbon atoms are aromatized according to the present invention by contacting a feedstock containing the hydrocarbon with the above-described catalyst. This reaction is carried out at low pressure, i.e., about 0.5 to 5 atmospheres and preferably at atmospheric pressure, and at a temperature of about 850°F. to about 1,050°F., preferably about 900°F. to about 1,000°F. The space velocity is generally in the range of about 0.1 to 4 V/V/Hr. High conversions of paraffinic hydrocarbons, with high selectivity of aromatics formation, are obtained.

The feedstock for aromatizations according to this invention comprises paraffinic hydrocarbons having at least 6 carbon atoms, and particularly n-hexane and n-heptane. The feedstock may be the effluent from a platinum catalyst reformer or a cut from the pipestill containing appreciable quantities of n-hexane and $C_7$ paraffins. Substantially pure n-hexane and n-heptane can also be treated. The feedstock is contacted with the catalyst, either in a fixed or a moving bed.

The catalyst, as indicated earlier, comprises (a) a catalytically-active material containing a divalent metal, tetravalent molybdenum, and oxygen in chemically combined form, and (b) a support comprising deacidified alumina. The divalent metal is one having an ionic radius not exceeding about 0.95 A in the divalent state.

Molybdenum in the catalytically-active materials of the present invention has an oxidation state of +4. Molybdenum having an oxidation state of +4 will be referred to herein as "tetravalent molybdenum," and the catalyst is designated as a ternary molybdenum (IV) oxide. The catalytically-active material is a compound having the formula $$M_2Mo_3O_8$$

where M is a divalent metal. Preferred divalent metals represented by M are magnesium, zinc, iron, cobalt, and nickel as previously indicated. Compounds of the above formula are known per se, having been described, for example, in W. H. McCarroll et al., *J. Am. Chem. Soc.*, 79, 5410–5414 (1957), and in C. B. Ansell et al., *Acta. Cryst.*, 21, 482 (1966), but the compounds have never been formed as an active part of a catalytic composite, nor have their utility as catalysts ever been heretofore appreciated.

The support for the present catalysts is deacidified alumina, i.e., alumina containing a small amount of a Group IA or IIA metal oxide as deacidifying agent. Exemplary of such deacidifying agents are salts such as halides, nitrates, carbonates or the like of the Group IA or IIA metals which will decompose to form a basic oxide in situ, e.g., the oxides of lithium, sodium, potassium, beryllium, magnesium, and the like, though various other oxides and salts can be employed to effect deacidification of the acid sites on the support as will be apparent to those skilled in the art (see, e.g., U.S. Pat. No. 3,692,293). The amount of deacidifying agent is generally equivalent to about 1 to 5 gram atoms of the Group IA metal per 100 moles of alumina. Small amounts of silica may be present in the support, although such presence ordinarily is not preferred.

The preferred carrier or support for catalysts of this invention is cesium-doped alumina such as that described in Canadian Pat. No. 747,969. Some aromatization activity is obtained by impregnating conventional catalyst carriers, such as silica, alumina, or mixtures of the two, with the catalytic compound of this invention, but aromatization selectivity is usually considerable worse when an acid-type carrier such as unmodified alumina or silica-alumina is used. In order to obtain good selectivity, the carrier is deacidified, preferably by doping with a small percentage of cesium as described in the aforementioned Canadian Pat. No. 747,969. Doping is effected by impregnating the alumina support with a water-soluble cesium compound, and by calcining the alumina so that the cesium atoms diffuse into and become part of the alumina crystal lattice. Various adsorptive aluminas such as gamma-alumina, eta-alumina, and hydrated aluminas such as alpha-alumina monohydrate, betaalumina trihydrate, and mixtures thereof, may be used, and excellent results have been obtained using beta-alumina trihydrate. The amount of cesium introduced into the alumina corresponds to about 1 to 5 gram atoms Cs per 100 moles of $Al_2O_3$. Excellent catalyst supports for this invention have been obtained using 5 moles of Cs, as $Cs_2O$, per 100 moles of $Al_2O_3$.

The catalyst of the present invention contains a major proportion of deacidified alumina support and a minor proportion of catalytically-active agent. The composition of the catalyst, stated in gram atoms of metal per 100 moles of alumina, is as follows: divalent metal M, 1 to 60 gram atoms; Mo, 1.5 to 90 gram atoms; Cs (or other Group IA metal), 1 to 5 gram atoms. (All metals are present in chemically combined form and Mo is in the tetravalent state, as previously emphasized.) It will be observed that the ratio of divalent metal M to molybdenum is not necessarily 2:3, which is the stoichiometric ratio corresponding to the formula $M_2Mo_3O_8$. There may be an excess of Metal M. In that case, it is theorized that the excess is present as the metal oxide MO. Molybdenum may also be present in excess, in which case any excess is probably present as the oxide $MoO_2$. Generally, the divalent metal M will be present either in the stoichiometric quantity corresponding to the formula $M_2Mo_3O_8$, or in excess. In a preferred embodiment, a catalyst is obtained in which the molar ratio of constituents, stated as gram atoms of metal per 100 moles of $Al_2O_3$, is as follows: $M:Mo:Cs:Al_2O_3 = 20-30:30-45:3-5:100$.

The catalyst of this invention may be prepared by impregnating the cesium-doped alumina support successively with a water-soluble compound of molybdenum and a water-soluble compound of the divalent metal, calcining after each impregnation, followed by treatment with hydrogen to reduce the molybdenum from the +6 to the +4 oxidation state. The order of impregnation of molybdenum and the divalent metal is not critical, but for the purposes of illustration the present invention will be described with reference to a procedure in which the support is impregnated first with molybdenum. In accordance with such a procedure, the support, preferably cesium-doped alumina, is impregnated with a water-soluble molybdenum salt such as ammonium heptamolybdate, $(NH_4)_6Mo_7O_{24} \cdot 4H_2O$, the impregnated support is dried and then calcined at elevated temperature in the range of about 800°F. to about 1,100°F. This yields molybdenum trioxide supported on cesium-doped alumina. The concentration of the impregnating solution is chosen so as to introduce the desired quantity of $MoO_3$. The supported molybdenum trioxide on alumina thus obtained is then impregnated with a water-soluble salt of the desired divalent metal. Nitrates are particularly well adapted for this impregnation; for example, magnesium nitrate, cobalt nitrate, and nickel nitrate may be used. Of course, other water-soluble salts of these metals, such as the chlorides, may also be used. The concentration of the solution may be chosen so as to introduce the stoichiometric quantity of divalent metal corresponding to the formula $$M_2Mo_3O_8$$

or an excess of the divalent metal (a deficiency of divalent metal M may be introduced, but this is not the usual procedure). Excellent results have been obtained, for example, by impregnating the salt with equimolar quantities of metal oxide, MO, and molybdenum trioxide, $MoO_3$. The desired compound $M_2Mo_3O_8$ is formed, even though the divalent metal is present in excess.

After the catalyst support has been impregnated with both molybdenum and divalent metal, and before the catalyst is put into use, the molybdenum is reduced from the hexavalent to the tetravalent state. This is readily accomplished in most instances by passing hydrogen through a bed of the supported catalyst at elevated temperatures, e.g., about 1,000°F. to 1,300°F., and at atmospheric or elevated pressure, for example, about 0 to 400 psig. After all of the molybdenum has been reduced, the catalyst is then ready for use.

Aromatization according to the present invention is carried out at low pressures and at elevated temperatures, and in the absence of any added hydrogen in the feed. The aromatization may be carried out quite well at atmospheric pressure, although generally pressures in the range of about 0 to about 60 psig are suitable. Preferred operating temperatures are about 900°F. to 957°F., although temperatures of about 850°F. to 1,050°F. may be used. The space velocity of hydrocarbon feed, expressed in volumes of hydrocarbon (measured in the liquid state) per unit volume of catalyst per hour (V/V/Hr.) may range widely, for example, from about 0.1 to 4.0, and typical space velocities are in the range of about 0.3 to about 1.0 V/V/Hr. It is known that addition of hydrogen with the feed is detrimental to the formation of aromatics, and therefore the use of a pure hydrocarbon feed (i.e., no added hydrogen) is preferred.

The present invention gives outstandingly good results in the conversion of hydrocarbons, such as n-hexane and n-heptane, to aromatics. For example, initial conversions of 60% or higher with selectivities of 90% or more may be obtained with the catalyst of this invention. Selectivity is defined as the quantity of aromatic hydrocarbon formed, divided by the amount of aliphatic hydrocarbon which is reacted. A particularly desirable feature of the catalysts of this invention is that selectivity does not diminish appreciably, even when the catalyst has been on stream for a substantial length of time. In this respect the catalyst of this invention compares most favorably with the chromia on cesium-doped alumina catalyst (where the cesium-doped alumina is identical to that used herein) described in Canadian Pat. No. 747,969. While the initial conversions and selectivities may be slightly higher using the chromia on cesium-doped alumina catalyst of the Canadian patent, there is an appreciable decline in both conversion and selectivity using the chromia catalyst, while there is very little loss of selectivity (although there is some loss of conversion) using the supported ternary molybdenum (IV) oxide catalysts of this invention.

A further outstanding feature of the catalysts of this invention is that they may be regenerated easily with substantially complete restoration of catalytic activity. Regeneration may be accomplished with either air of hydrogen. One regeneration procedure is to regenerate with hydrogen at an elevated temperature, e.g., about 850°F. to 1,300°F. Regeneration with hydrogen is more easily carried out than with air and is therefore preferred. The catalysts of this invention are unusual among aromatization catalysts in that most catalysts of this class must be regenerated with air or oxygen and cannot be regenerated effectively with hydrogen.

The present invention can also be used for the upgrading of naphtha feedstocks containing appreciable portions of paraffinic hydrocarbons and boiling in the motor fuel range. For example, a conventional reformate from a refinery may be contacted with the catalyst of the present invention at low pressure, e.g., atmospheric pressure, and at low space velocities in the range of about 0.1 to 4 V/V/Hr. In such an operation, the hydrocarbon feedstock may be first catalytically reformed, as for example with a platinum catalyst, and at elevated tempertures and pressures according to procedures known in the art. The effluent from the last reactor is cooled and passed to a separator drum where the condensed reformate is separated from the uncondensed tail gas. A portion of the tail gas which is rich in hydrogen is recycled; the remainder is treated according to known procedures to recover $C_4$ and heavier hydrocarbons. The hydrocarbon reformate is then further refined and upgraded according to this invention. This reformate, which consists primarily of hydrocarbons boiling in the motor fuel range and which is essentially free of hydrogen, is depressured to the desired aromatization pressure (preferably atmospheric), vaporized, and passed over the ternary molybdenum (IV) oxide on deacidified alumina catalyst as described herein. Aromatization is carried out at pressures of about 1 to 5 atmospheres, at temperatures in the range of about 900°F. to 1,050°F., and at space velocities of about 0.1 to 4 V/V/Hr. (based on liquid feed volume). The reformate may initially have an octane number (RON) of about 75 to 95, depending on the severity of hydroforming. This can be improved significantly by aromatization according to this invention. Enhanced gasoline yields are obtained by combining the aromatization process of this invention with a conventional catalytic reforming or hydroforming process, rather than by use of the catalytic reforming process alone to obtain fuel of the desired octane rating. This is because the catalytic reforming process may be operated under milder than usual conditions, reducing the amount of hydrocracking with attendant production of light hydrocarbons. The catalysts of the present invention are highly selective for the production of aromatics, with little hydrocracking taking place. Suppose, for example, that a motor fuel having an RON of 95 is desired. Such a fuel can be produced in a catalytic reformer, but with substantial cracking of paraffins boiling in the motor fuel range. A fuel of the same RON can be produced by catalytically reforming a feed naphtha to an RON of about 89–91 (say about 90), and then aromatizing the reformate to an RON of 95 according to this invention. Cracking during reforming is much less, giving a reformate of considerably greater (typically about 5 to 10% more based on total reformate) paraffin content. This paraffin content is then converted to aromatics at selectivities generally in the range of about 85 to 95% according to this invention. This gives greater gasoline yields and smaller amount of $C_1$-$C_5$ hydrocarbons which have less value.

The catalyst of this invention can also be used in other hydrogenation and dehydrogenation reactions, for example, dehydrogenation of low molecular weight paraffins such as propane and butane, and olefins such as butenes. It can also be used for other types of reactions, e.g., hydrodesulfurization of various petroleum fractions, as well as hydrocarbon oxidation.

EXAMPLE 1

A cesium-doped alumina catalyst support was prepared as follows: 1,560 grams of beta-alumina trihydrate was impregnated with an aqueous solution of 101 grams of $CsNO_3$. The impregnated alumina was dried and then calcined for 8 hours at 1,600°F. The product contained 5 gram atoms of Cs, as $Cs_2O$, per 100 moles of $Al_2O_3$, with a surface area of about 65 to 90 $m^2/g$.

A 218 gram portion of the cesium-doped alumina was impregnated with an aqueous solution of 106 grams of ammonium heptamolybdate, $(NH_4)_6Mo_7O_{24}\cdot 4H_2O$, dried at 250°F., and calcined 4 hours at 1,000°F. This yielded molybdenum trioxide, $MoO_3$, on cesium-doped alumina containing 30 gram atoms of Mo and 5 gram atoms of Cs per 100 moles of $Al_2O_3$.

A 76 gram portion of molybdenum trioxide on cesium-doped alumina, prepared as described above in this Example, was impregnated with an aqueous solution of 38.5 grams of $Mg(NO_3)_2\cdot 6H_2O$, dried at 250°F., and calcined for 4 hours at 1,000°F. The calcined product, magnesium molybdate, had the composition of 30 gram atoms of Mg, 30 gram atoms of Mo, and 5 gram atoms of Cs per 100 moles of $Al_2O_3$.

The molybdenum in the catalyst was reduced from the hexavalent to the tetravalent state by passing hydrogen through a bed of catalyst for 70 minutes at 1,100°F., 1 atmosphere, and a space velocity of 100 to 200 V/V/Hr. where the volume of $H_2$ gas is measured at standard temperature and pressure.

EXAMPLE 2

Molybdenum trioxide on alumina was prepared as described in Example 1. A 76 gram portion of this product was impregnated with an aqueous solution of 44.6 grams of zinc nitrate, $Zn(NO_3)_2\cdot 6H_2O$, dried at 212°F. to 250°F., and calcined for 4 hours at 1,000°F. The resulting zinc molybdate on cesium-doped alumina had a composition (expressed in gram atoms per 100 moles of $Al_2O_2$) of $Zn:Mo:Cs:Al_2O_3 = 30:30:5:100$. The molybdenum in the catalyst was reduced with hydrogen at 1,200°F., 200 psig, for 1 hour.

EXAMPLE 3

Molybdenum trioxide on alumina was prepared as described in Example 1. A 76 gram portion of this product was impregnated with an aqueous solution of 26.9 grams of manganese nitrate, $Mn(NO_3)_2$, dried at 250°F., and calcined for 4 hours at 1,000°F. The product had a composition of 30 gram atoms of Mn, 30 gram atoms of Mo, and 5 gram atoms of Cs, per 100 moles of $Al_2O_3$. The molybdenum in the catalyst was reduced from the hexavalent to the tetravalent state with hydrogen at 1,100°F., 200 psig, for 1 hour.

EXAMPLE 4

Molybdenum trioxide on alumina was preapred as described in Example 1. A 76 gram portion of this product was impregnated with 29.1 grams of cobalt nitrate, $Co(NO_3)_2\cdot 6H_2O$, dried at 250°F., pelletized into pellets having a diameter of one-sixteenth to one-eighth inch, and calcined for 4 hours at 1,200°F. The product had a composition of 20 gram atoms of Co, 30 gram atoms of Mo, and 5 gram atoms of Cs, per 100 moles $Al_2O_3$. This product was reacted with hydrogen at 1,100°F. and 200 psig for 1 hour to reduce the molybdenum from the hexavalent to the tetravalent state.

EXAMPLE 5

Molybdenum trioxide on alumina was prepared as described in Example 1. A 76 gram portion of the product was impregnated with 29.1 grams of nickel nitrate, $Ni(NO_3)_2\cdot 6H_2 O$, dried at 250°F., and calcined for 4 hours at 1,000°F. The product had a composition of 20 gram atoms of Ni, 30 gram atoms of Mo, and 5 gram atoms of Cs, per 100 moles $Al_2O_3$. The molybdenum was reduced to the tetravalent state with hydrogen at 1,100°F. and 200 psig for 1 hour.

Experimental data have clearly demonstrated that the molybdenum and divalent metals chemically combine to form "metallic clusters" or compounds having the formula $M_2Mo_3O_8$, as heretofore described, provided that a deacidified alumina base is used as a support in formation of these catalysts. It is the formation of these compounds which is responsible for the outstanding and unique catalytic properties.

To demonstrate the necessity of using a deacidified support in formation of the $M_2Mo_3O_8$ cluster compounds, series of data were obtained wherein attempts were made to produce $Mg_2Mo_3O_8$, $Zn_2Mo_3O_8$ and $Ni_2Mo_3O_8$, respectively, composited with an alumina support. In one series of runs (D, E and F) magnesium, zinc and nickel catalysts were prepared precisely as described by reference to Examples 1, 2 and 5, respectively, and the catalysts were reduced, in the final step of catalyst preparation, at 1,000°F., 1,100°F. and 1,200°F., respectively. In another series of runs (A, B and C) the catalysts were similarly prepared except that the alumina was not deacidified. In other words, but for the presence of nonsintered, nondeacidified or ordinary alumina vis-a-vis deacidified alumina the conditions employed for the runs were identical. The results are given in the following table:

TABLE

| Run | Attempted Structure | Reduction Temp., °F. | X-Ray Inspection[1] |
|---|---|---|---|
| A | $Mg_2Mo_3O_8/Al_2O_3$ | 1000 | No Cluster |
|   | do. | 1100 | do. |
|   | do. | 1200 | do. |
| B | $Zn_2Mo_3O_8/Al_2O_3$ | 1000 | do. |
|   | do. | 1100 | do. |
|   | do. | 1200 | do. |
| C | $Ni_2Mo_3O_8/Al_2O_3$ | 1000 | do. |
|   | do. | 1100 | do. |
|   | do. | 1200 | do. |
| D | $Mg_2Mo_3O_8/CDA$[2] | 1000 | Cluster is Present |
|   | do. | 1100 | do. |
|   | do. | 1200 | — |
| E | $Zn_2Mo_3O_8/CDA$ | 1000 | Cluster is Present |
|   | do. | 1100 | do. |
|   | do. | 1200 | Some Cluster Present |
| F | $Ni_2Mo_3O_8/CDA$ | 1000 | No Cluster |
|   | do. | 1100 | do. |
|   | do. | 1200 | Cluster is Present |

[1] McCarrol et al, JACS, Vol. 79, Page 79, Page 5410 (1957).
[2] CDA - Cesium-doped alumina.

The results thus clearly indicate the presence of the metallic clusters in most of the preparations in which cesium-doped or deacidified alumina is used and conversely the absence of the metallic clusters, as revealed by X-ray analysis, in all preparations in which ordinary $Al_2O_3$, i.e., not deacidified or sintened $Al_2O_3$, is used as the support.

In general, it was also found that increased reduction temperature led to increased formation of molybdenum metal and decreased cluster formation. The metallic cluster was found for more resistant to reduction than the molybdenum oxide, $MoO_2$, amounting to a stabilization of Mo (IV) by the divalent cation.

EXAMPLE 6

Normal heptane was aromatized by passage through a fixed bed of magnesium molybdenum (IV) oxide catalyst prepared according to Example 1. Operating conditions were 925°F., atmospheric pressure, space velocity of 0.3 V/V/Hr., and no hydrogen added with the feed. The percentage of aromatization and the selectivity (which is the amount heptane converted to aromatics divided by the total conversion of heptane) as a function of time on stream are given in Table I below. For comparison, aromatization under the same conditions except for a space velocity of 0.45 V/V/Hr. was carried out using a molybdenum trioxide on cesium-doped alumina catalyst prepared as described in Example 1. Results are reported in Table I below.

TABLE I

| Run | Catalyst | Space Velocity, V/V/Hr. | Hours on Stream | % Conversion | % Selectivity |
|---|---|---|---|---|---|
| 1 | Mg molybdenum (IV) oxide on Cs-Al$_2$O$_3$ | 0.3 | 0 | 59.7 | 92.2 |
| | | | 2–2.5 | 51.1 | 92.5 |
| | | | 19–20 | 30.4 | 86.7 |
| 2 | MoO$_3$ on Cs-Al$_2$O$_3$ | 0.45 | 0 | 51.2 | 85.8 |
| | | | 2–2.5 | 42.3 | 87.9 |
| | | | 19–20 | 14.0 | 76.1 |

The responses of the two catalysts to hydrogen regeneration at 1,050°F., 200 psig, for 2 to 3 hours were significantly different. In the case of the magnesium molybdenum (II) oxide, the % aromatization increased to 69.1 with selectivity of 91.1%, whereas the MoO$_3$ catalyst gave 35.8% aromatization with 80.0% selectivity.

EXAMPLE 7

This example compares the magnesium molybdenum (IV) oxide catalyst of Example 1 with chromia on cesium-doped alumina as a catalyst for aromatization of normal heptane. The chromia-on-alumina catalyst used for comparison purposes was made by impregnating 214 grams of cesium-doped alumina, prepared as described in Example 1, with an aqueous solution of 40 grams of CrO$_3$ (as chromic acid) followed by drying and then by calcination for 4 hours at 1,000°F. Two runs were carried out, using the magnesium molybdenum (IV) oxide catalyst of Example 1 in Run 1 and the chromia comparison catalyst in Run 2.

Normal heptane was passed through a fixed catalyst bed at atmospheric pressure, a temperature of about 920°F. to 925°F., and with no hydrogen added with the feed in each run. Space velocities (based on liquid n-heptane) and results are as indicated in Table II below.

TABLE II

| Run | Catalyst | Space Velocity, V/V/Hr. | Hours on Stream | % Conversion | % Selectivity |
|---|---|---|---|---|---|
| 1 | Mg molybdenum (IV) oxide on Cs-Al$_2$O$_3$ | 0.3 | 0 | 65 | 92 |
| | | | 2.5 | 55 | 93 |
| | | | 20 | 35 | 87 |
| 2 | CrO$_3$ on Cs-Al$_2$O$_3$ | 0.5 | 0 | 72 | 94 |
| | | | 3 | 62 | 93 |
| | | | 21 | 18 | 69 |

After about 21 hours on stream, each catalyst was regenerated by passing hydrogen gas through the catalyst bed for about 2.75 to 3 hours at 1,050°F. and 200 psig. Aromatization of n-heptane was again carried out under the same conditions as before, using the regenerated catalysts. After the regenerated catalysts had been on stream about an hour, a 60% conversion with 91% selectivity was obtained with the catalyst of Example 1, while a 36% conversion with 85% selectivity was obtained with the chromia catalyst.

EXAMPLE 8

Normal heptane vapor was passed through a bed of zinc molybdenum (IV) oxide catalyst prepared as described in Example 2, at a temperature of 920°F. to 925°F., a presure of 1 atmosphere, and at a space velocity of 0.3 V/V/Hr. There was no hydrogen added with the feed. The catalyst had been pretreated in a hydrogen atmosphere at 1,200°F. and 200 psig for 1 hour. The percentage of aromatization and the selectivity as functions of time on stream are given in Table III below.

TABLE III

| Time on Stream | % Aromatization | % Selectivity |
|---|---|---|
| 0 Hrs. | 46.7 | 90.1 |
| 0.75 Hrs. | 43.7 | 92.7 |
| 1.75 Hrs. | 39.6 | 91.7 |
| 19 Hrs. | 15.8 | 76.5 |

EXAMPLE 9

Normal heptane vapor free of hydrogen was passed through a bed of manganese molybdenum (IV) oxide catalyst prepared as described in Example 3. The temperature, pressure, and space velocity were 925°F., 1 atmosphere, and 0.72 V/V/Hr., respectively. The percentage aromatization was 22.0%, with 94.5% selectivity.

Earlier, the catalyst in the molybdate (+6) form had been pretreated with hydrogen for 1 hour at 575°F., then for one-half hour at 750°F., followed by one-half hour at 925°F., then n-heptane was passed through the catalyst at 925°F., atmospheric pressure, and at a space velocity of 0.3 V/V/Hr. The percentage aromatization was only 2.2%, with a selectivity of 22.5%, indicating that this catalyst reduction procedure was ineffective.

EXAMPLE 10

A hydrogen-free normal heptane feed was passed through a bed of cobalt molybdenum (IV) oxide catalyst prepared as described in Example 4, at 925°F., atmospheric pressure, and a space velocity of 0.72 V/V/Hr. The catalyst had been pretreated with hydrogen at 1,100°F. and 200 psig for 1 hour. The percentage aromatization was 11.8%, with 81.1% selectivity.

EXAMPLE 11

Hydrogen-free normal heptane was passed through a bed of nickel molybdenum (IV) oxide catalyst prepared as described in Example 5, at 920°F. to 925°F., atmospheric pressure, and a space velocity of 0.72 V/V/Hr. The catalyst had been pretreated with hydrogen at 1,100°F. and 200 psig for 1 hour. The results are given in Table IV below.

TABLE IV

| Time on Stream | % Aromatization | % Selectivity |
|---|---|---|
| 0 Hrs. | 33.4 | 82.5 |
| 2.1 Hrs. | 37.9 | 88.8 |
| 3.2 Hrs. | 39.2 | 88.2 |
| 4.3 Hrs. | 40.1 | 88.9 |

EXAMPLE 12

An 88 RON reformate from a platinum catalyst reforming ("Powerforming") unit, containing 200 ppm of sulfur as thiophene, was passed through a bed of supported magnesium molybdenum (IV) oxide catalyst prepared as described in Example 1. This run was carried out at atmospheric pressure, 975°F., and a space velocity of 0.75 V/V/Hr., with no hydrogen added with the feed. The run was carried out for 20 hours, the catalyst regenerated with hydrogen, and the run continued for an additional time. Product samples were collected in 2 cuts; namely, from 3 to 18 hours on stream, and from 18 to 20 hours on stream, and their RON values determined. After 20 hours, the catalyst was regenerated with hydrogen at 1,050°F., 200 psig, for 2¾ hours. The reformate was then passed through the catalyst bed under the same conditions as before. The results are shown in Table V below.

TABLE V

| Hours on Stream | RON |
|---|---|
| 3-18 | 92 |
| 18-20 | 90.6 |
| Following H₂ Regeneration | 92 |

Having described the invention, what is claimed is:

1. A process for aromatizing a paraffinic hydrocarbon containing at least 6 carbon atoms which comprises contacting a feedstock containing said hydrocarbon at aromatization conditions with a catalyst comprising (a) a catalytically active material comprising a compound having the formula $$M_2Mo_3O_8$$

where M is a divalent metal having an ionic radius not greater than 0.95 A, and (b) a support comprising deacidified alumina in which said deacidified alumina comprises alumina and a minor amount of a metal oxide selected from the group consisting of Group I-A metal oxides and Group II-A metal oxides.

2. A process according to claim 1 in which said feedstock is in the vapor phase.

3. A process according to claim 1 in which said divalent metal is selected from the group consisting of magnesium, zinc, iron, cobalt, and nickel.

4. A process according to claim 1 in which the pressure is in the range of about 1 to about 5 atmospheres.

5. A process according to claim 1 in which the reaction temperature is in the range of about 850°F. to about 1,050°F.

6. A process according to claim 1 in which said feedstock contains substantially no added hydrogen.

7. A process according to claim 1 in which said support comprises alumina and a minor amount of a Group I-A metal oxide.

8. A process according to claim 7 in which said Group I-A metal oxide is cesium oxide.

9. A process for upgrading a naphtha boiling in the motor fuel range to increase the aromatics content and decrease the amount of paraffins, which comprises contacting said naphtha at aromatization conditions with a catalyst comprising (a) a catalytically active material comprising a compound having the formula $$M_2Mo_3O_8$$

where M is a divalent metal having an ionic radius not greater than 0.95 A and (b) a support comprising deacidified alumina in which said deacidified alumina comprises alumina and a minor amount of a metal oxide selected from the group consisting of Group I-A metal oxides and Group II-A metal oxides.

10. A process according to claim 9 in which said naphtha is a reformate from a catalytic reforming unit.

11. A process according to claim 10 in which the temperature is in the range of about 850°F. to about 1,050°F. and the pressure is in the range of about 0.5 to 5 atmospheres.

* * * * *